United States Patent
Ballier et al.

(10) Patent No.: US 12,535,600 B2
(45) Date of Patent: Jan. 27, 2026

(54) INDIVIDUAL SELF-CONTAINED DEVICE FOR MEASURING IONISING RADIATION

(71) Applicant: ISYMAP, Pont-Saint-Esprit (FR)

(72) Inventors: Aurelien Ballier, Pont-Saint-Esprit (FR); Marie-Anne Lissandre, Pont-Saint-Esprit (FR)

(*) Notice: Subject to any disclaimer, the term of this patent is extended or adjusted under 35 U.S.C. 154(b) by 335 days.

(21) Appl. No.: 18/253,928

(22) PCT Filed: Nov. 26, 2021

(86) PCT No.: PCT/EP2021/083187
§ 371 (c)(1),
(2) Date: May 23, 2023

(87) PCT Pub. No.: WO2022/112508
PCT Pub. Date: Jun. 2, 2022

(65) Prior Publication Data
US 2023/0408709 A1    Dec. 21, 2023

(30) Foreign Application Priority Data

Nov. 26, 2020  (FR) ...................................... 2012168

(51) Int. Cl.
*G01T 1/02*  (2006.01)

(52) U.S. Cl.
CPC ...................... *G01T 1/02* (2013.01)

(58) Field of Classification Search
CPC ....................................................... G01T 1/02
See application file for complete search history.

(56) References Cited

FOREIGN PATENT DOCUMENTS

| JP | 2016525674 A | * | 8/2016 | ............... G01T 1/02 |
| WO | 2015119526 A1 | | 8/2015 | |
| WO | 2020142728 A1 | | 7/2020 | |

OTHER PUBLICATIONS

ISR; European Patent Office; NL; Feb. 24, 2022.
Heo et al., (2018). Wireless, battery-free, flexible, miniaturized dosimeters monitor exposure to solar radiation and to light for phototherapy. Science translational medicine, 10(470), eaau1643. https://doi.org/10.1126/scitranslmed.aau1643; Dec. 5, 2018.

* cited by examiner

*Primary Examiner* — David P Porta
*Assistant Examiner* — Fani Polyzos Boosalis
(74) *Attorney, Agent, or Firm* — Patshegen IP; Moshe Pinchas

(57) ABSTRACT

The individual autonomous device for measuring at least one ionising radiation comprises:
- at least one sensor (52) of each said ionising radiation, supplying an electrical signal representative of the quantity of each said ionising radiation;
- a wireless signal transmitter (53) configured to remotely transmit data representative of each signal supplied by a sensor; and
- an autonomous electric power source (54) configured to power each detector and this transmitter;
- the sensor, transmitter and power source being embedded in an assembly (50) with a surface area of less than sixty mm$^2$, and the total weight of the assembly, sensor, transmitter and power source being less than ten grammes.

15 Claims, 4 Drawing Sheets

INDIVIDUAL SELF-CONTAINED DEVICE FOR MEASURING IONISING RADIATION

TECHNICAL FIELD OF THE INVENTION

The present invention relates to an individual autonomous device for detecting and measuring ionising radiation. It applies to the field of the safety of operators in areas where ionising radiation is likely to be present.

STATE OF THE ART

The regulations require that, during operations with exposure to ionising radiation, the risks for the operators have to be taken into account and quantified. The risk is taken into account by carrying out workstation studies. The risk is quantified by means of dosimeters.

Two large families of dosimeter are used:

Passive dosimeters provide no instant measurements, and require subsequent analysis in a laboratory. These devices are considered the most reliable, and are generally used for legal dosimetry. These devices do not make it possible to distinguish the day or worksite on which the dose was captured, nor do they enable the dose rate to be known instantly and the integrated dose to be known rapidly.

Passive dosimeters can be used for:
whole body dosimetry, making it possible to estimate the dose taken by the operator;
extremity dosimetry, making it possible to more precisely estimate the dose taken by the operator at the level of the fingers or eye lens, for example.

Active dosimeters enable the dose rate and dosimetry of the operators to be measured in real time. These devices make it possible to alert the operator in real time, and in particular notify him if he risks exceeding the dosimetry threshold envisaged for his operation during the prior study phase. Despite the fact that these devices are not used for legal dosimetry, it is mandatory to carry them since they alert the operator of danger and at the same time give a quantitative indication.

PRESENTATION OF THE INVENTION

The present invention aims to remedy all or part of these drawbacks and, in particular, to provide an active dosimetry solution for the extremities and eye lens.

To this end, the present invention envisages an individual autonomous device for measuring at least one ionising radiation, which comprises:
  at least one sensor of each said ionising radiation, supplying an electrical signal representative of the quantity of each said ionising radiation;
  a wireless signal transmitter configured to remotely transmit data representative of each signal supplied by a sensor; and
  an autonomous electric power source configured to power each detector and this transmitter,
  the sensor, transmitter and power source being embedded in an assembly with a surface area of less than sixty $mm^2$, and the total weight of the assembly, sensor, transmitter and power source being less than ten grammes.

The device that is the subject of the invention thus makes it possible for its bearer and/or a supervisor to have real-time knowledge of the flow of ionising radiation and/or the dose integrated by the operator who bears the device.

The device applies not only to professional operators operating in an environment where ionising radiation is likely to be present, but also, for example, to nuclear medicine, where the device makes it possible to control, in real time, the dose integrated by an organ or an area of the body during a radiotherapy session, while minimising the constraint on the patient.

The device that is the subject of the present invention presents significant miniaturisation, despite the constraints associated with the electrical equipment. The subject of the present invention makes it possible to detect ionising radiation, including Gamma/Beta radiation measured for nuclear applications by formatting the signal representative of the radiation detected.

The energy from this radiation is in the order of nano-Amperes, which is too low to supply energy to the device that is the subject of the present invention. That is why the device must have an additional energy source, which increases the number and size of the components of the device that is the subject of the present invention, while remaining embedded in an assembly with a surface area of less than sixty $mm^2$ and a weight of less than ten grammes in order to be placed at the extremities or eye lens of the operator.

In some embodiments, the device that is the subject of the invention comprises a bias-voltage generator, each ionising radiation sensor utilising this bias voltage, where the bias voltage is the output voltage from the autonomous electric power source or a voltage stabilised close to the voltage of the autonomous electric power source.

In this way, the number of electrical components of the device is reduced, which boosts its miniaturisation.

In some embodiments, the device that is the subject of the invention comprises a single signal processing component configured to perform the functions of pre-amplification, amplification and formatting for the signal supplied by each sensor.

In this way, the number of electrical components of the device is reduced, which boosts its miniaturisation.

In some embodiments, the single signal processing component has:
  a high input impedance;
  a low input bias current (<1 pA);
  low noise (<10 nV/Hz);
  a large bandwidth (>10 MHz).

These characteristics enable the miniaturisation of the device that is the subject of the invention, while ensuring a very high signal quality.

In some embodiments, the device that is the subject of the invention comprises a single component for analysing the signal supplied by each sensor after amplification, this component also comprising the wireless signal transmitter.

In this way, the number of electrical components of the device is reduced, which boosts its miniaturisation.

In some embodiments, the device that is the subject of the invention comprises a single multifunction component to protect the autonomous electric power source against voltage surges, deep discharges and overheating, manage the charge of the autonomous electric power source, and manage the power supply voltage of the analysis circuit.

In this way, the number of electrical components of the device is reduced, which boosts its miniaturisation and its autonomy.

In some embodiments, management of the power supply of the assembly by the single multifunction component is configured as follows:
  to supply, at most, two different voltages;

if there is more than one voltage, the voltages are between one-and-a-half and one-half of the voltage of the autonomous electric power source.

In this way, the number of electrical components of the device is reduced, which boosts its miniaturisation and its autonomy.

The benefit of these embodiments is also to limit the voltage differences between the voltage of the battery and the voltages required by the system. As the efficiency of the voltage converters is not 100%, limiting the voltage differences limits energy losses and therefore allows a smaller battery to be used for the same autonomy.

In some embodiments, the device that is the subject of the invention also comprises a mobile terminal comprising a receiver of the data transmitted by the transmitter of the assembly and a means for signalling to the bearer of the miniature assembly when these data represent a prompt radiation or integrated radiation greater than a predefined limit value.

This mobile terminal allows the bearer of the assembly to obtain a measurement of the integrated dose as well as the dose rate at the location of the assembly, for example, at the location of the operator's hands or eyes. The operator is therefore alerted in real time to a dosimetry or dose rate being exceeded.

In some embodiments, the device that is the subject of the invention also comprises a local relay of data transmitted by the transmitter of the assembly, a relay configured for the long-distance retransmission of the data transmitted by the transmitter of the assembly.

The relay enables the wired or wireless long-distance transmission of the information and also makes it possible to determine the area in which the device is located.

In some embodiments, the device that is the subject of the invention also comprises a central receiver of data transmitted by the transmitter and a system for managing these data.

As each device is linked to a single operator, it is possible to accurately monitor the dosimetry of each operator in real time while estimating the ambient dose rates of the environment in which the operator works. Each supervisor is therefore alerted in real time to a dosimetry or dose flow rate being exceeded.

In some embodiments, the device that is the subject of the invention comprises a ring bearing this assembly.

As this ring can be worn on the finger of the operator, under protective gloves, a dosimetry of extremities can be performed.

In some embodiments, the device that is the subject of the invention comprises a small case comprising this assembly, and this case can be clipped onto glasses or incorporated in a strap.

This case makes it possible to perform the dosimetry at the level of the eye lens or any specific part of the body.

In some embodiments, the device that is the subject of the invention comprises a memory of an identifier of the assembly, workstation or bearer of the assembly, the wireless signal transmitter being configured to remotely transmit this identifier with data representative of each signal supplied by a sensor.

In this way the bearer of the ring can be identified, with no risk of error in the assignment of the doses measured. In this way, the dosimetric information can be filed by a supervision software system.

In some embodiments, the interior space of the assembly, between each sensor, the transmitter and the power source, is resin-sealed.

Resin-sealing the interior space of the assembly is possible because the optimisation of the electrical consumption has made it possible to reduce the heat emissions. The benefit of resin-sealing the device is, in particular, to reduce the size of the assembly and make the device more resilient to shocks and vibrations.

In some embodiments, the transmitter is configured to transmit data at a distance less than the communication distance of a local wireless network.

In some embodiments, the device that is the subject of the invention comprises a means for detecting that an operator is bearing the assembly, and a means for activating the operation of each sensor and the transmitter of the assembly once it is detected that an operator is bearing the assembly.

In some embodiments, the assembly comprises an autonomous memory for storing values captured and/or values calculated.

In the event of a failure of communication, this memory enables a subsequent transmission.

The different particular characteristics of the present invention are intended to be combined to form different individual autonomous devices for measuring at least one ionising radiation presenting all or part of the advantages described above.

BRIEF DESCRIPTION OF THE FIGURES

Other advantages, aims and particular features of the invention will become apparent from the non-limiting description that follows of at least one particular embodiment of the device that is the subject of the invention, with reference to drawings included in an appendix, wherein.

DESCRIPTION OF THE EMBODIMENTS

The present description is given in a non-limiting way, in which each characteristic of an embodiment can be combined with any other characteristic of any other embodiment in an advantageous way.

Note that the figures are not to scale.

Throughout the description, the term 'operator' is used both for a professional operating in an environment where ionising radiation is likely to be present; and for patients in nuclear medicine, especially receiving radiotherapy treatment.

It is noted here that ionising radiation is a form of energy released by atoms and is spread by means of electromagnetic waves (gamma rays or x-rays) or particles (neutrons, alpha or beta particles). The spontaneous disintegration of atoms is called radioactivity, and the excess energy is emitted in the form of ionising radiation. The unstable elements that disintegrate while emitting ionising radiation are called radionuclides.

All radionuclides are uniquely identified by the type of radiation they emit, the energy of this radiation, and their half-life.

The activity—which measures the quantity of radionuclide present—is expressed in a unit called the becquerel (Bq): one becquerel corresponds to one disintegration per second. The half-life is the time needed for a radionuclide's activity to be reduced to half of its original value. It is also the time required for one-half of its atoms to decay. The half-life can vary from a mere fraction of a second to millions of years (for example, iodine-131 has a half-life of 8 days, while carbon-14 has a half-life of 5730 years).

It is noted here, in particular, that ultraviolet rays ("UV") are not ionising radiation.

Figure 1:
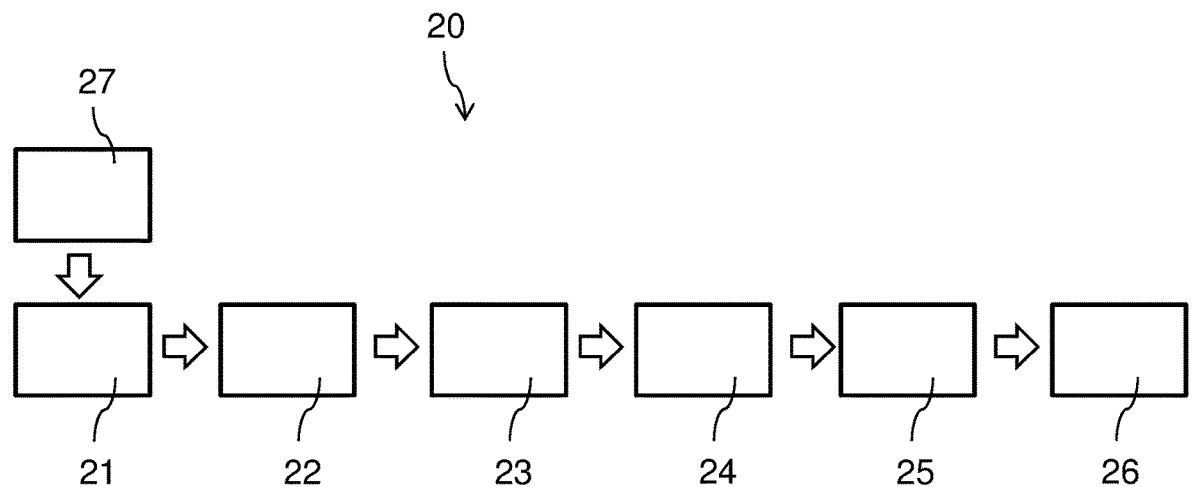
FIG. 1 represents, in the form of a block diagram, a signal processing chain of an ionising radiation detector of a device that is the subject of the invention.

FIG. 1 shows a signal processing chain 20 for detecting an ionising radiation. This 20 comprises a bias voltage 21 and an ionising radiation sensor 22 utilising this bias voltage 21. The signal coming from the sensor 22 is pre-amplified by a pre-amplifier 23 and then amplified by an amplifier 24. The amplified signal is then formatted by a formatting module 25, before being analysed by an analyser 26.

The miniaturisation of the device relates, in particular, to its technical characteristics below:
the bias voltage 21 is the voltage of a battery 27, for example, of LiPo type (3.0 to 4.2 V DC), or a voltage stabilised close to the voltage of the battery 27, preferably, the same as that supplying the pre-amplifier 34 (2.8 V);
the sensor 21 has a dimension of the order of twenty mm$^2$;
all processing of the signal is performed via a single component 29;
the analysis of the signal 26 is performed via a component 33 that comprises the wireless signal transmitter 31.

Figure 2:
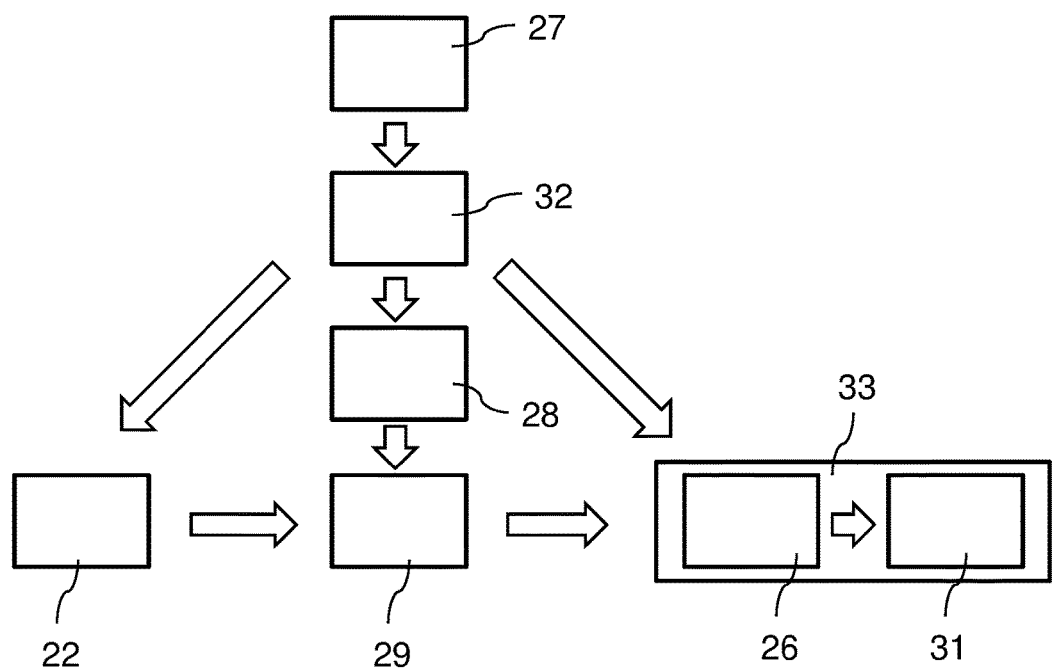
FIG. 2 represents, in the form of a block diagram, functions of an electronic circuit of a device that is the subject of the invention.

The electronic circuit is shown in FIG. 2. It comprises a management system 32 for the battery 27 which provides a direct voltage 28, the sensor 22, the signal processing component 29 and the signal analysis and wireless remote transmission component 33. The signal processing component 29 performs the pre-amplification 23, amplification 24 and formatting 25 functions illustrated in FIG. 1.

The signal processing component 29 has:
a high input impedance;
a low input bias current (<1 pA);
low noise (<10 nV/Hz);
a large bandwidth (>10 MHz).

It is noted here that high impedance is defined, in electronics, as follows:

In electronics, high impedance is the state of an output pin that is not controlled by its component. In digital components, this means that the signal has a logical level neither high nor low. Such a signal can be considered an open circuit (or as a "floating" wire) since, if connected to a low impedance component, it will not affect it. Most of the pins of integrated circuits are in fact tristate outputs that are connected internally to inputs.

In analog electronics the high impedance mode is defined when there is no low impedance path on any of the other nodes. High impedance in analog electronics allows high amplification levels to be obtained for a low power consumption.

Management of the power supply by the management system 32 for the battery 27 is optimised as follows:
the number of different voltages provided is limited to two, which reduces the number of components;
the efficiency of the power supplies is boosted by using close operating voltages, i.e. between one-and-a-half and one-half of the voltage of the battery, e.g. 3.6 V DC;
a signal processing component 29 is chosen using the variable voltage range of the battery of 3 to 4.2 V DC, the 2.8 V DC power supply of the signal processing component 29 makes it possible to use the full charge of the battery, and therefore to limit the battery's size for an equivalent autonomy;
a single multifunction component 32 is used to protect the battery 27 (against voltage surges, deep discharges and overheating), manage the charge of the battery 27, and manage the power supply voltage of the analysis circuit 26.

For optimising the layers of the printed circuit bearing all the electronic components of the device, the circuit configuration is on a printed circuit with six layers, which increases the density of the conductive tracks.

Figure 3:
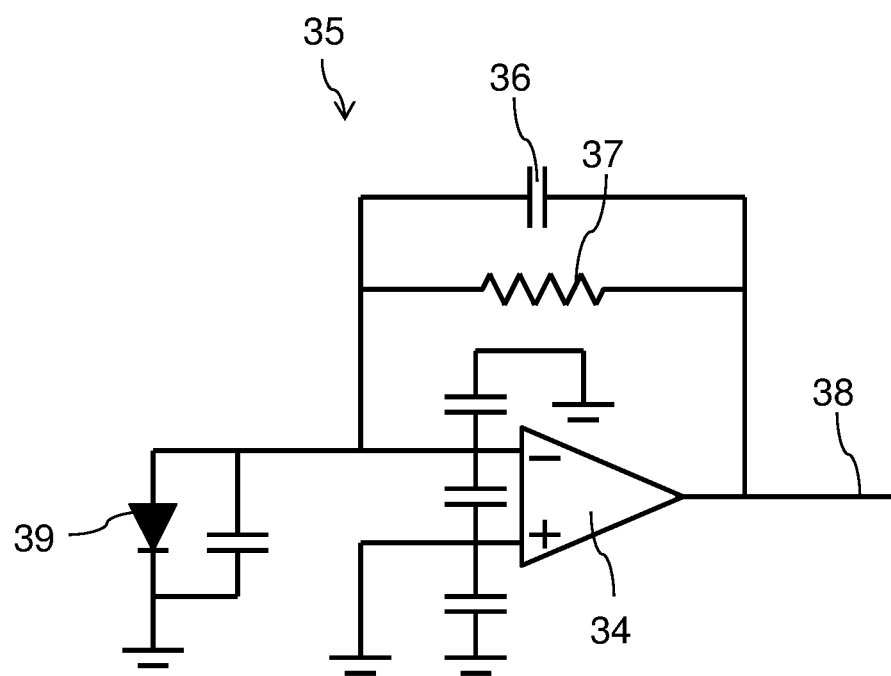
FIG. 3 represents a pre-amplification portion of the electronic circuit shown in FIG. 2.

FIG. 3 shows the circuit configuration 35 of the operational amplifier 34 performing the pre-amplification.

The components selected are miniature. Preferably, they are welded with tin microbeads on the underneath of the component, which allows a minimum footprint on the electronic board.

The low power consumption of the components means that they generate low heat emissions. Preferably, the components and the entire printed circuit are resin-sealed, which has several advantages. Firstly, the dimensions of the case are minimised, and, secondly, this ensures the physical integrity of the components in response to impacts or various mechanical stresses.

The CSP ("Central Signal Processor") is an important element of the analog chain. It transforms the low electrical charges from the radiation/matter interaction inside the sensor into voltage.

A CSP generates an output signal 38 by charging the capacitor 36 via the charges of the sensor, and these charges are amplified by means of a feedback loop so as to have an exploitable output signal 38. The resistor 37 makes it possible to discharge the capacitor 36 and generate output pulses rather than a high or low state.

A semiconductor 39 forming a radiation sensor, has a capacitor on input that gives the circuit additional complexity, compensated for by the other capacitors of the circuit configuration, which correspond to the input capacitors of the operational amplifier 34.

Two stability factors are to be taken into account:
the resistor 37 must be sufficiently large to not introduce noise on the CSP. Values between 10 and 100 MO have been validated experimentally;
the capacitor 36 must be small enough to ensure the quickest collection of the charges of the sensor. Values between 0.5 and 2.0 pF have been validated experimentally.

Figure 4:
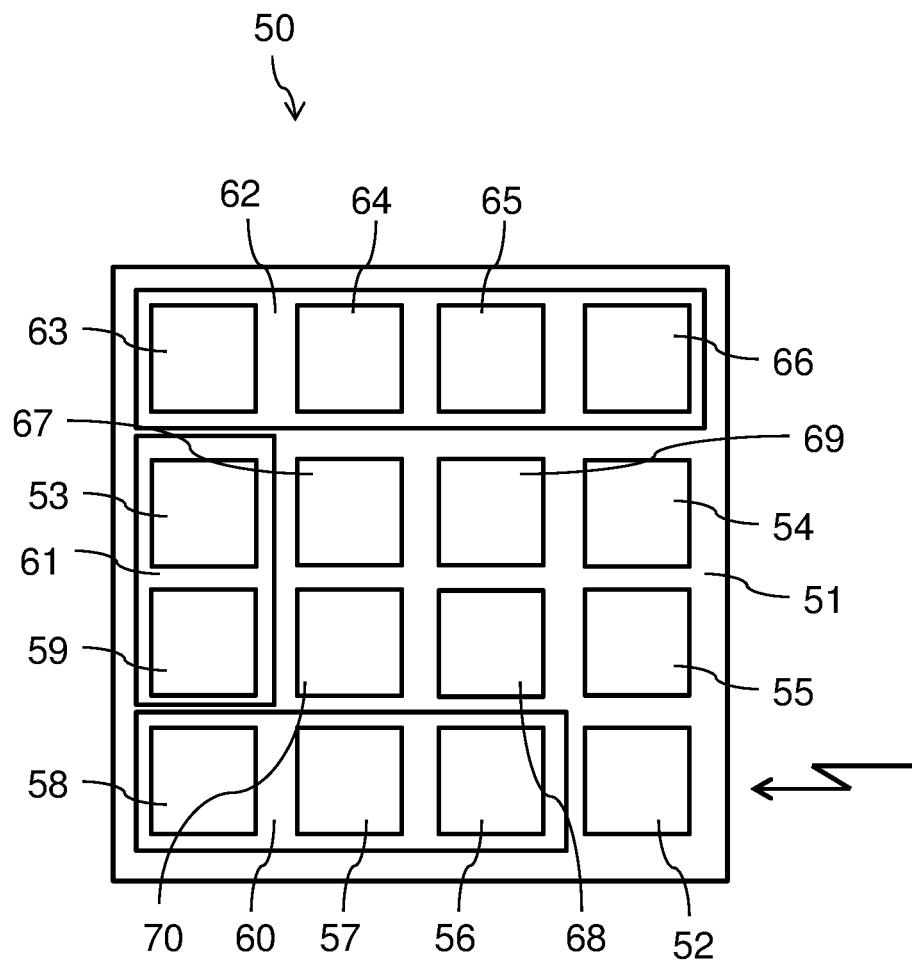
FIG. 4 represents functions of an electronic circuit of a miniature circuit of a device that is the subject of the invention.

FIG. 4 shows an assembly 50 with a surface area of less than sixty mm$^2$ and a weight of less than ten grammes, which comprises, on a printed circuit 51:
a sensor 52 of ionising radiation, supplying an electrical signal representative of the quantity of the ionising radiation;
a wireless signal transmitter 53 which remotely transmits data representative of each signal supplied by a sensor;
a bias-voltage generator 55, the sensor 52 utilising this bias voltage.

An autonomous electric power source 54, configured to power each detector and this transmitter, is not mounted directly on the printed circuit 51, but is connected to it by conductive wires.

Figure 5:
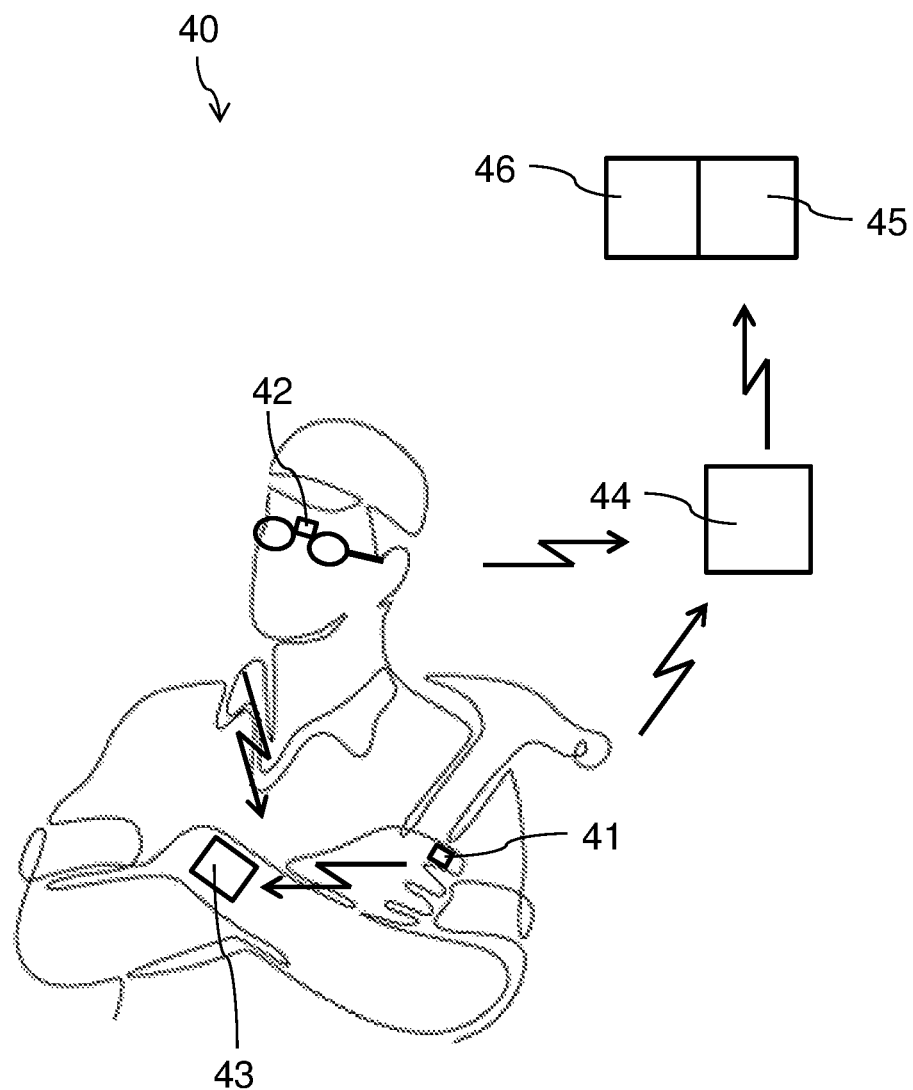
FIG. 5 represents a particular embodiment of the device that is the subject of the invention.

The components illustrated in FIG. 4 are embedded in a light, miniature assembly 50 that can be carried by an operator without discomfort, in the form of a ring under a glove or on glasses, as shown in FIG. 5.

Preferably, the bias voltage is the output voltage from the autonomous electric power source 54 or a voltage stabilised close to the voltage of the battery 27, preferably, the same as that supplying the pre-amplifier 34 (2.8 V).

Preferably, the transmitter 53 is configured to transmit data at a distance less than the communication distance of a local wireless network. In this way, the electrical consumption of this transmitter 53 is reduced.

Preferably, a single signal processing component 60 performs the functions of pre-amplification 56, amplification 57 and formatting 58 of the signal supplied by each sensor.

Preferably, the single signal processing component has:
a high input impedance;
a low input bias current (<1 pA);
low noise (<10 nV/Hz);
a large bandwidth (>10 MHz).

Preferably, a single component 61 for analysing 59 the signal supplied by the sensor 52 after amplification, also comprises the wireless signal transmitter 53.

The analysis 59 performs the calculation of the flow of ionising radiation and the dose integrated by the operator, the transmitter 53 transmitting the calculated values in real time.

Preferably, a single multifunction component 62 performs the functions 63 of protecting the autonomous electric power source against voltage surges, deep discharges and overheating, managing 64 the charge of the autonomous electric power source, managing 65 the power supply voltage of the analysis component 61 and managing 66 another power supply voltage of components of the assembly 51. In this way, the number of electrical components of the device is reduced, which boosts its miniaturisation and its autonomy.

Preferably, management 66 of the power supply of the assembly by the single multifunction component 62 is configured as follows:
to supply, at most, two different voltages;
if there is more than one voltage, the voltages are between one-and-a-half and one-half of the voltage of the autonomous electric power source.

In this way, the number of electrical components of the device is reduced, which boosts its miniaturisation and its autonomy.

Preferably, the autonomous electric power source 54 is a rechargeable or disposable battery, associated with a wired or wireless means for transferring electrical energy.

In the embodiment shown in FIG. 4, the circuit 51 comprises a memory 67 of an identifier of the assembly 50, workstation or bearer of the assembly, the wireless signal transmitter 53 being configured to remotely transmit this identifier with data representative of each signal supplied by a sensor 52.

In this way the bearer of the ring can be identified, with no risk of error in the assignment of the doses measured. In this way, the dosimetric information can be filed by a supervision software system.

As each device is linked to a single operator, it is possible to accurately monitor the dosimetry of each operator in real time while estimating the ambient dose rates of the environment in which the operator works. The device that is the subject of the invention thus makes it possible for its bearer and/or a supervisor to have real-time knowledge of the flow of ionising radiation and/or the dose integrated by the operator who bears the device. Where necessary, the operator and each supervisor are alerted in real time to a dosimetry or dose rate being exceeded.

In some embodiments, the circuit 51 comprises a means 68 for detecting that an operator is bearing the assembly 50, and a means 69 for activating the operation of each sensor and the transmitter of the assembly once it is detected that an operator is bearing the assembly 50. The means 68 for detecting the bearing of the assembly 50 can be, for example, a dry contact, a motion sensor, a temperature sensor.

In some embodiments, the circuit 51 comprises an autonomous memory 70 for storing values captured by the sensor 52 and/or values calculated by the analysis 59. In the event of a failure of communication, this memory 70 enables a subsequent transmission.

Thus, the assembly 50 makes it possible to:
measure the integrated dose as well as the dose rate at the level of the hands of the operator;
transmit the measurements in real time to a remote screen and a centralised information system;
configure alert thresholds by dose rate and integrated dose;
identify the bearer of the device;
log in to a touchless workstation to enable the dosimetric information to be filed via a supervision software system.

Although a single sensor 52 is shown in FIG. 4, the assembly 50 can comprise a plurality of sensors sensitive to different types of ionising radiation.

Preferably, the interior space of the assembly 50, in particular between each sensor, the transmitter and the power source, is resin-sealed, which increases its resilience to shocks and vibrations.

Preferably, the assembly 50 also comprises a contactless identification means (not shown), for example a barcode or an electronic tag, for example a passive RFID (acronym for Radio Frequency IDentification) type. This identification means makes it possible to associate the assembly with an area of activity, a workstation or an operator, for the purposes of traceability and certification.

FIG. 5 shows a device 40 comprising:
an assembly 50 borne by a ring 41 on the finger of the operator; and
an assembly 50 in a case 42 clipped onto the glasses of the operator or fixed on a headband (not shown).

As this ring 41 can be worn on the finger of the operator, under protective gloves, a dosimetry of extremities can be performed.

The case 42 makes it possible to perform the dosimetry at the level of the eye lens or any specific part of the body.

In the embodiment shown in FIG. 5, the device 40 also comprises a mobile terminal 43, here borne on the wrist of the operator, which comprises a receiver of the data transmitted by the transmitter 53 of each assembly 50 and a signalling means.

The signalling means, for example a screen, a light emitting diode and/or a loudspeaker, signals to the bearer of the assemblies 50 when the data received by the mobile terminal 43 represent a prompt radiation or integrated radiation greater than a predefined limit value. Preferably, the prompt radiation limit value and the integrated radiation limit value can be modified.

The mobile terminal 43 allows the bearer of the assembly 50 to obtain a measurement of the integrated dose as well as the dose rate at the location of the assembly 50, here at the location of the operator's hands and eyes. The operator is therefore alerted in real time to a dosimetry or dose rate being exceeded.

In the embodiment shown in FIG. 5, the device 40 also comprises a local relay 44 of data transmitted by the transmitter 53 of each assembly 50. This local relay 44 retransmits, over a long distance, the data transmitted by the transmitter 53 of each assembly 50. This long-distance retransmission of the data is made via a wired or wireless link. Preferably, the local relay 44 links its identifier to the data retransmitted, which makes it possible to determine the area in which the device 40 is located.

Note that this local relay 44 is even more necessary when the transmitter 53 is configured to transmit data at a distance less than the communication distance of a local wireless network.

In the embodiment shown in FIG. 5, the device 40 comprises a central receiver of data transmitted by the transmitter 53 of each assembly 50, and a system 46 for managing these data.

The invention claimed is:

1. An individual autonomous device (40) for measuring at least one ionising radiation, comprising:
at least one sensor (22, 52) of each said ionising radiation, supplying an electrical signal representative of the quantity of each said ionising radiation;
a wireless signal transmitter (31, 53) configured to remotely transmit data representative of each signal supplied by a sensor; and
an autonomous electric power source (27, 54) configured to power each detector and this transmitter;
wherein the sensor, transmitter and power source being embedded in an envelope (50) with a surface area of less than sixty mm$^2$, and the total weight of the assembly, sensor, transmitter and power source being less than ten grammes;
a single signal processing component (60) configured to perform functions of pre-amplification (56), amplification (57) and formatting (58) of the signal supplied by each sensor (22, 52), wherein the single signal processing component (60) has:
a high input impedance;
a low input bias current (<1 pA);
low noise (<10 nV/Hz);
a large bandwidth (>10 MHz).

2. The device (40) according to claim 1, which comprises a bias-voltage generator (21, 55), each ionising radiation sensor (22, 52) utilising this bias voltage, wherein the bias voltage is the output voltage from the autonomous electric power source (27, 54) or a voltage stabilised close to the voltage of the autonomous electric power source (27, 54).

3. The device according to claim 1, which comprises a single component (61) for analysing (59) the signal supplied by the sensor (22, 52) after amplification, this component also comprising the wireless signal transmitter (31, 53).

4. The device (40) according to claim 3, which comprises a single multifunction component (62) to protect (63) the autonomous electric power source against voltage surges, deep discharges and overheating, manage (64) the charge of the autonomous electric power source, and manage (65) the power supply voltage of the single circuit (61) for analysis (59).

5. The device (40) according to claim 4, wherein management (65) of the power supply of the assembly (50) by the single multifunction component (62) is configured as follows:
to supply, at most, two different voltages;
if there is more than one voltage, the voltages are between one-and-a-half and one-half of the voltage of the autonomous electric power source (54).

6. The device (40) according to claim 1, which also comprises a mobile terminal (43) comprising a receiver of the data transmitted by the transmitter (31, 53) of the assembly (50) and a means for signaling to the bearer of the assembly when these data represent a prompt radiation or integrated radiation greater than a predefined limit value.

7. The device (40) according to claim 1, which also comprises a local relay (44) of data transmitted by the transmitter (31, 53) of the assembly (50), a relay configured for the long-distance retransmission of the data transmitted by the transmitter of the assembly.

8. The device (40) according to claim 1, which also comprises a central receiver (45) of data transmitted by the transmitter, and a system (46) for managing these data.

9. The device (40) according to claim 1, which comprises a ring (41) bearing this assembly (50).

10. The device (40) according to claim 1, which comprises a small case (42) comprising this assembly (50), and this case can be clipped onto glasses or incorporated in a strap.

11. The device (40) according to claim 1, which comprises a memory (67) of an identifier of the assembly (50), workstation or bearer of the assembly, the wireless signal transmitter (31, 53) being configured to remotely transmit this identifier with data representative of each signal supplied by a sensor (22, 52).

12. The device (40) according to claim 1, wherein the interior space of the assembly (50), between each sensor (22, 52), the transmitter (31, 53) and the power source (27, 54), is resin-sealed.

13. The device (40) according to claim 1, wherein the transmitter (31, 53) is configured to transmit data at a distance less than the communication distance of a local wireless network.

14. The device (40) according to claim 1, which comprises a means (68) for detecting that an operator is bearing the assembly (50), and a means (69) for activating the operation of each sensor (22, 52) and the transmitter (31, 53) of the assembly once it is detected that an operator is bearing the assembly.

15. The device (40) according to claim 1, wherein the assembly (50) comprises an autonomous memory (70) for storing values captured and/or values calculated.

* * * * *